United States Patent [19]

Sefidvash et al.

[11] Patent Number: 5,517,615

[45] Date of Patent: May 14, 1996

[54] MULTI-CHANNEL INTEGRITY CHECKING DATA TRANSFER SYSTEM FOR CONTROLLING DIFFERENT SIZE DATA BLOCK TRANSFERS WITH ON-THE-FLY CHECKOUT OF EACH WORD AND DATA BLOCK TRANSFERRED

[75] Inventors: Khorvash Sefidvash, Laguna Niguel; Charles E. Nogales, San Juan Capistrano, both of Calif.

[73] Assignee: Unisys Corporation, Blue Bell, Pa.

[21] Appl. No.: 255,519

[22] Filed: Aug. 15, 1994

[51] Int. Cl.$^6$ .......................... G06F 13/00; G06F 11/00
[52] U.S. Cl. ...................... 395/182.03; 371/3; 371/47.1
[58] Field of Search ............................. 371/3, 16.1, 47.1; 395/250, 275, 575, 182.01, 182.02, 182.03, 182.04

[56] References Cited

U.S. PATENT DOCUMENTS

| | | |
|---|---|---|
| 3,582,906 | 6/1971 | Beausoliel et al. |
| 4,327,408 | 4/1982 | Frissell et al. ........................... 364/200 |
| 4,542,457 | 9/1985 | Mortensen et al. ...................... 364/200 |
| 5,291,496 | 3/1994 | Andaleon et al. ........................... 371/3 |
| 5,377,328 | 12/1994 | Benham .................................. 395/250 |
| 5,428,766 | 6/1995 | Seaman ................................... 395/575 |

*Primary Examiner*—Robert W. Beausoliel, Jr.
*Assistant Examiner*—Alan M. Fisch
*Attorney, Agent, or Firm*—Alfred W. Kozak; Mark T. Starr; Robert R. Axenfeld

[57] ABSTRACT

A buffer memory holding blocks of data received from a main host computer has dedicated portions for data destined for different sets of sender-receiver units. Each sender-receiver unit has a channel bus path to the buffer memory and each channel bus is monitored by an on-the-fly integrity checking circuit.

A control processor and associated bus arbitration logic provide signals to a multiplexer so as to allocate equal access periods to each channel bus for connection to the buffer memory. A data feeder control on each transfer channel senses the availability of data block words in each dedicated segment of the buffer memory so that partial transfers of word blocks may occur on minor cycles with subsequent completion of the blocks of data words on a major transfer cycle.

7 Claims, 6 Drawing Sheets

MULTI-CHANNEL INTEGRITY CHECKING DATA TRANSFER SYSTEM FOR CONTROLLING DIFFERENT SIZE DATA BLOCK TRANSFERS WITH ON-THE-FLY CHECKOUT OF EACH WORD AND DATA BLOCK TRANSFERRED

FIELD OF THE INVENTION

This disclosure refers to systems using multiple channels for data transfer with concurrent on-the-fly integrity checking for each channel.

BACKGROUND OF THE INVENTION

In the field of digital modules operating in networks, a basic operational function involves the transfer of data between the interconnected digital modules. During the course of data transfer, it is necessary to keep account of the amount of data being transferred and to insure that the data has been transferred with integrity on a reliable basis.

Figure 2A:
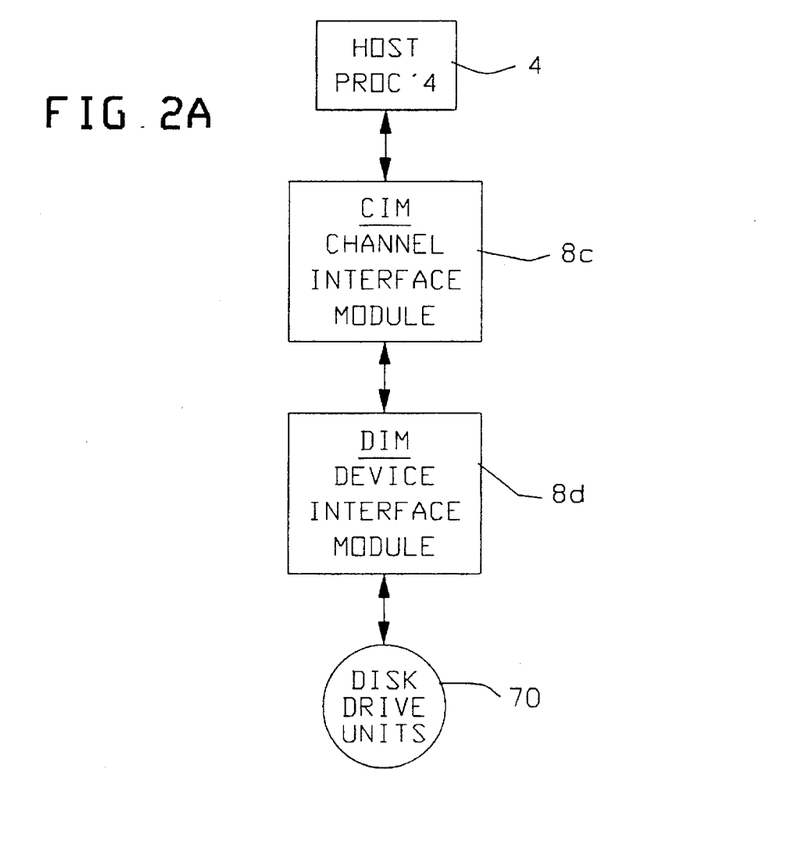
FIG. 2A is a generalized block diagram of the overall system network.

As seen in FIG. 2A, one generalized type of data transfer system involves the transfer of data between the host processor 4 and peripheral units such as disk drive units 70. The data transfer operations are seen to be transferred through a channel interface module $8_c$ which then transfers the data to the device interface module $8_d$ which can then communicate with the peripheral units 70 both for the output of data to the peripheral units and for the receipt of data from the peripheral units.

Figure 2B:
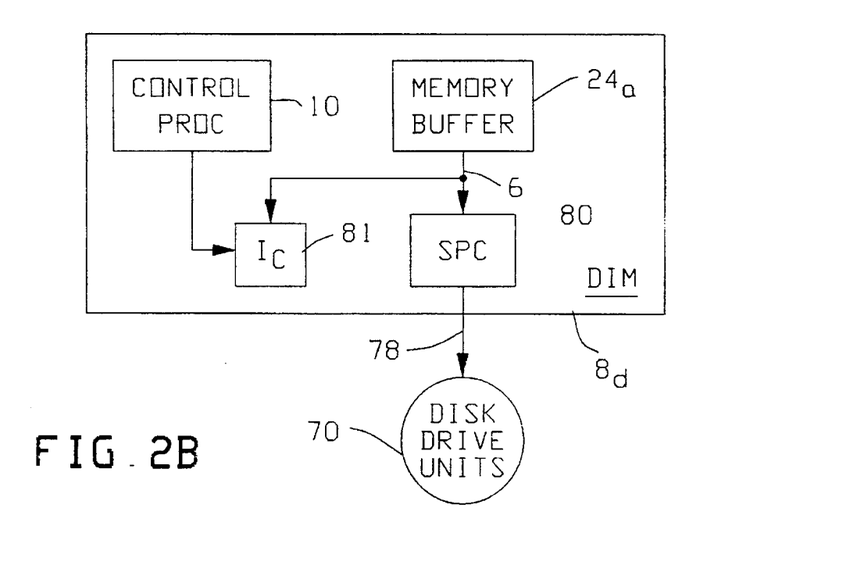
FIG. 2B, is a detailed block diagram of the device interface module (DIM) showing the channel bus 6 connecting the memory buffer with the protocol controller (SPC) and at the same time permitting an integrity circuit IC to check the data transferred on the bus.

FIG. 2B shows a semi-detailed drawing of the device interface module $8_d$ indicating that a memory buffer for temporary holding data being transferred can communicate with a SCSI Peripheral Controller SPC 80 in order to handle the transfers of data between the peripheral 70 and the memory buffer $24_d$. During the course of data transfer along the bus 6, an integrity circuit 81 will continuously monitor the transfer of data and insure that the integrity of data transferred is valid.

Figure 3:
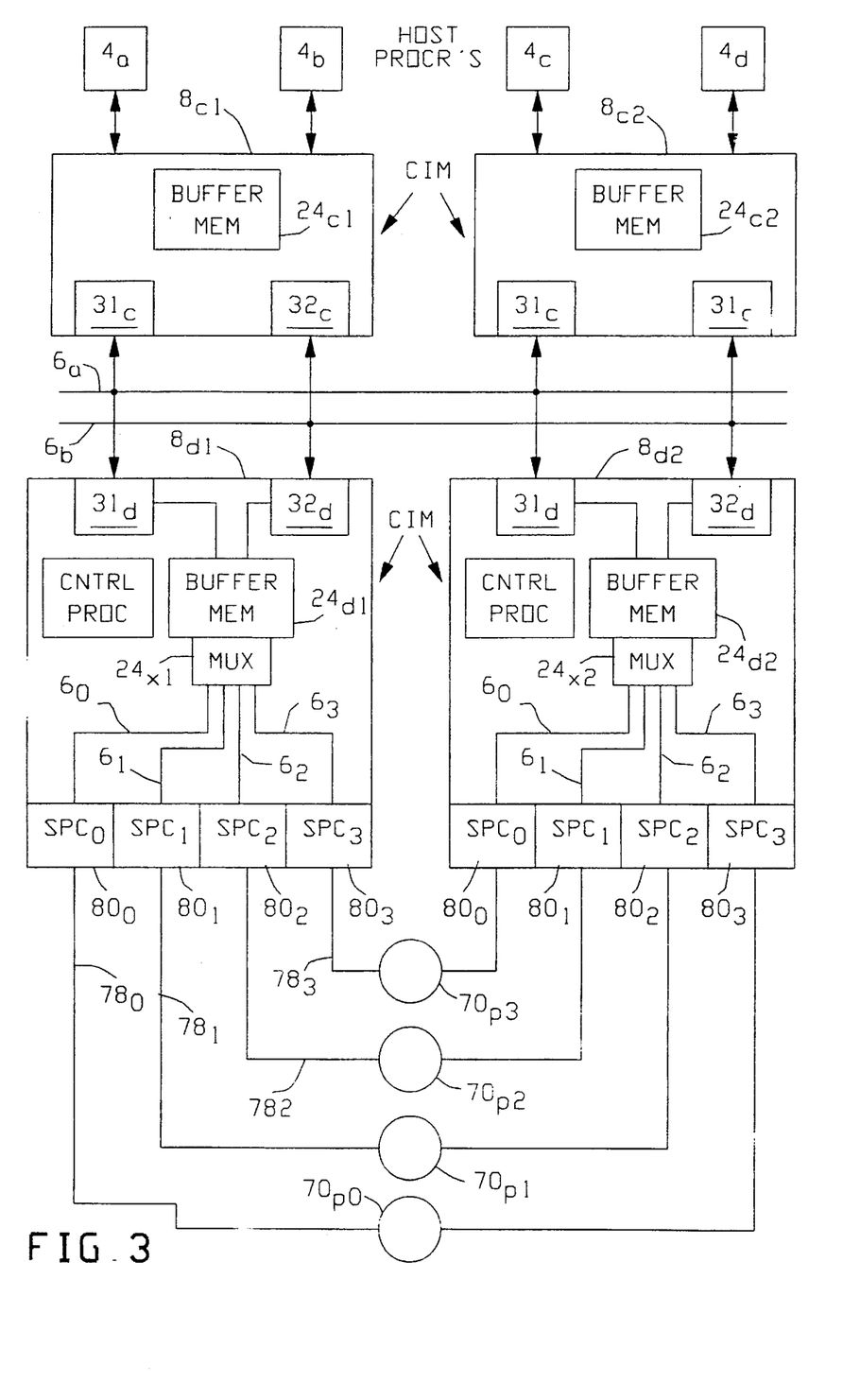
FIG. 3 is a more detailed diagram of the overall system showing a network with multiple numbers of device interface modules connected to dual system busses and allowing interconnection of multiple host processors to multiple numbers of peripheral devices.

FIG. 3 shows a more detailed view of the network which was basically shown in FIG. 2A. Here in FIG. 3 multiple numbers of host computers $4_a \ldots 4_d$ can communicate with channel interface modules $8_{c1}$ and $8_{c2}$. Each channel interface module has a buffer memory $24_{c1}$ and $24_{c2}$ which can temporarily hold data for transfer through two ports $31_c$ and $32_c$.

The two ports $31_c$ and $32_c$ are connected to dual system busses $6_a$ and $6_b$ which enable any host computer 4 to communicate through either one of the channel interface modules and then through either one of the dual ports $31_c$-$32_c$ onto the system buses $6_a$ and $6_b$ which enables data transfers to be passed on through multiple numbers of device interface modules, such as $8_{d1}$ and $8_{d2}$.

The device interface module $8_{d1}$ and $8_{d2}$ each have a buffer memory $24_{d1}$ and $24_{d2}$ which is connected through a multiplexor $24_{x1}$ and $24_{x2}$ on through multiple channels ($6_0$, $6_1$, $6_2$, $6_3$) to a set of four I/O ports designated as SCSI Protocol Controllers $SPC_0$, ($80_0$), $SPC_1$, ($80_1$), $SPC_2$, ($80_2$), and $SPC_3$, ($80_3$). It is then seen that the peripheral devices $70_a \ldots 70_d$ each can have dual I/O port connections to two sets of device interface modules. Thus, by allowing communication through two ports, there is also provision for communication to any one port should one of the other ports fail.

Figure 5A:
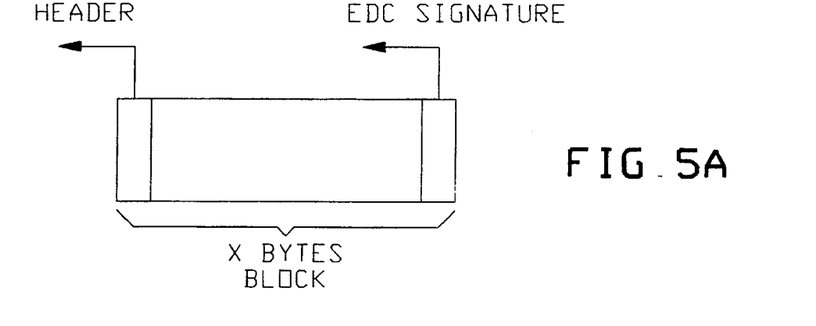
FIG. 5A is a drawing showing the protocol arrangement of a short block of data.

As seen in FIG. 5A, a block of data composed of "X" bytes will have a header portion which provides the address and destination of commands and includes information as to the size of the block. After the header, there is present the main bulk of the data block followed by a signature portion designated as the Error Detection Code (EDC) signature. The EDC signature is provided to characterize the value of the block of data and will represent the value of the data being transmitted in the main block.

Figure 5B:
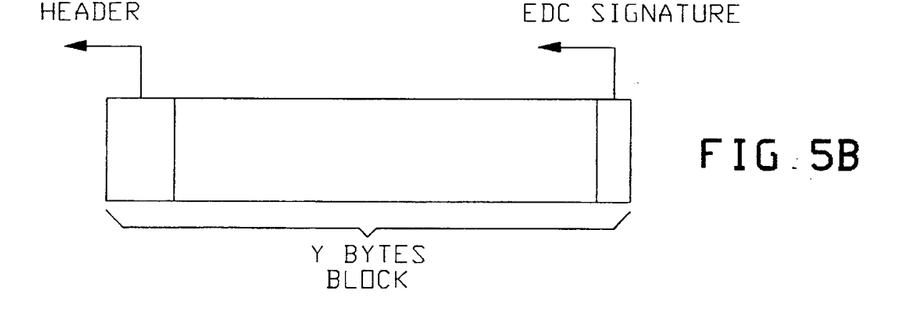
FIG. 5B is a drawing showing the arrangement of a longer block of data.

Subsequently, as seen in FIG. 5B, there may be data block transfers of a different volume or size as shown by the block designated "Y" bytes. Here again the header will provide the address, destination commands, block size, and other pertinent data, after which the main portion holds the data to be transferred followed by the EDC (Error Detection Code) which characterizes the data being transferred.

When a block of data, such as that of "X" bytes or that of "Y" bytes, is being transferred, it is necessary that some means be provided to recognize the block size and insure that the integrity of the data transfer be validated. It is further necessary to monitor the data transfer to see that the entire preselected number of bytes has been transferred.

Figure 6:
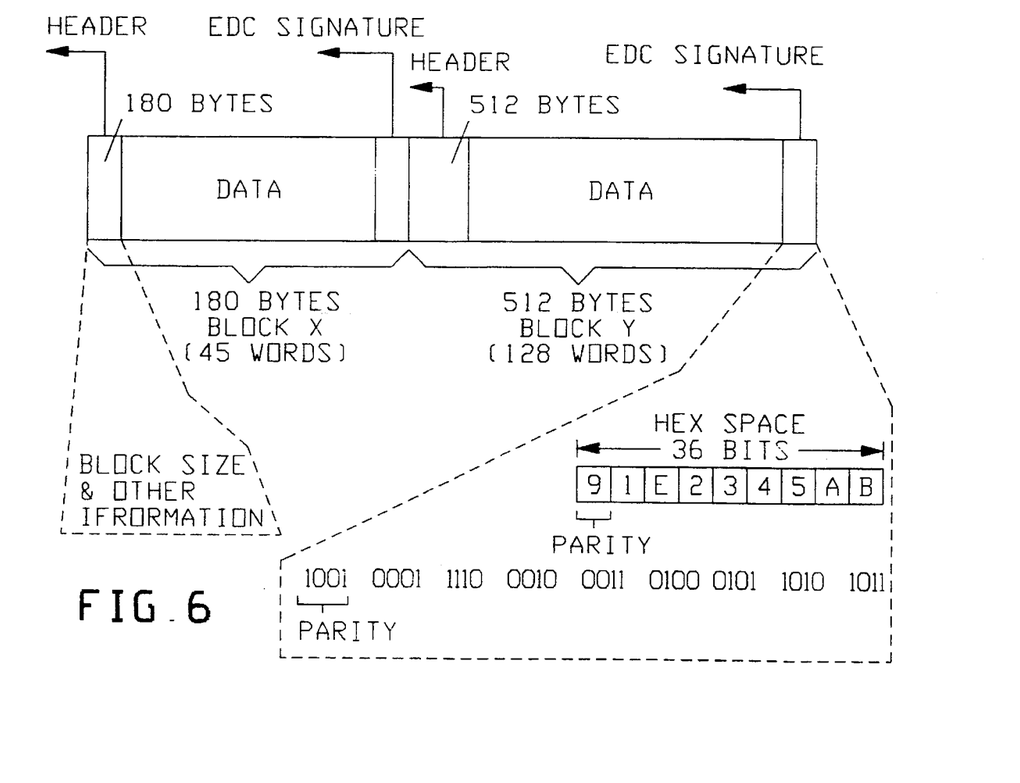
FIG. 6 shows a set of data blocks to be transferred which are of different size with the indication of the size of the data block indicated in the header and the error code data in the Error Detection Code signature areas.

As seen in FIG. 6, there is shown an example of the transfer of two different block sizes to be transmitted between a sending and receiving digital module, the first block size being of 180 bytes with a header and EDC signature. This is followed by a larger block size of 512 bytes which also has its own personal header portion and succeeding EDC signature. The presently described system operates to insure that there will be no delay in the data transfer operation even though blocks of different sizes are being transferred and additionally, that the different block sizes will be concurrently checked on-the-fly for integrity without any delay to the data transfer operation.

As illustrated in FIG. 6, blocks of data to be transferred can occur in different block sizes. For example, the first block in FIG. 6 has a block size of 180 bytes and the second block has a size of 512 bytes. FIG. 6 also illustrates how the header contains information as to the block size and how the EDC signature provides a Hexspace of 36 bits. The first bit involves a parity check and the remaining number of bits are used to provide an original EDC signature. In the present system involving the four channel busses ($6_0$, $6_1$, $6_2$, $6_3$) shown in FIG. 1, there is seen a device interface module $8_d$ which has a buffer memory $24_d$ holding data to be transferred between peripheral units ($70_{p0} \ldots 70_{p3}$) and any one of the said host processor $4_a \ldots 4_d$ of FIG. 3.

Figure 1:
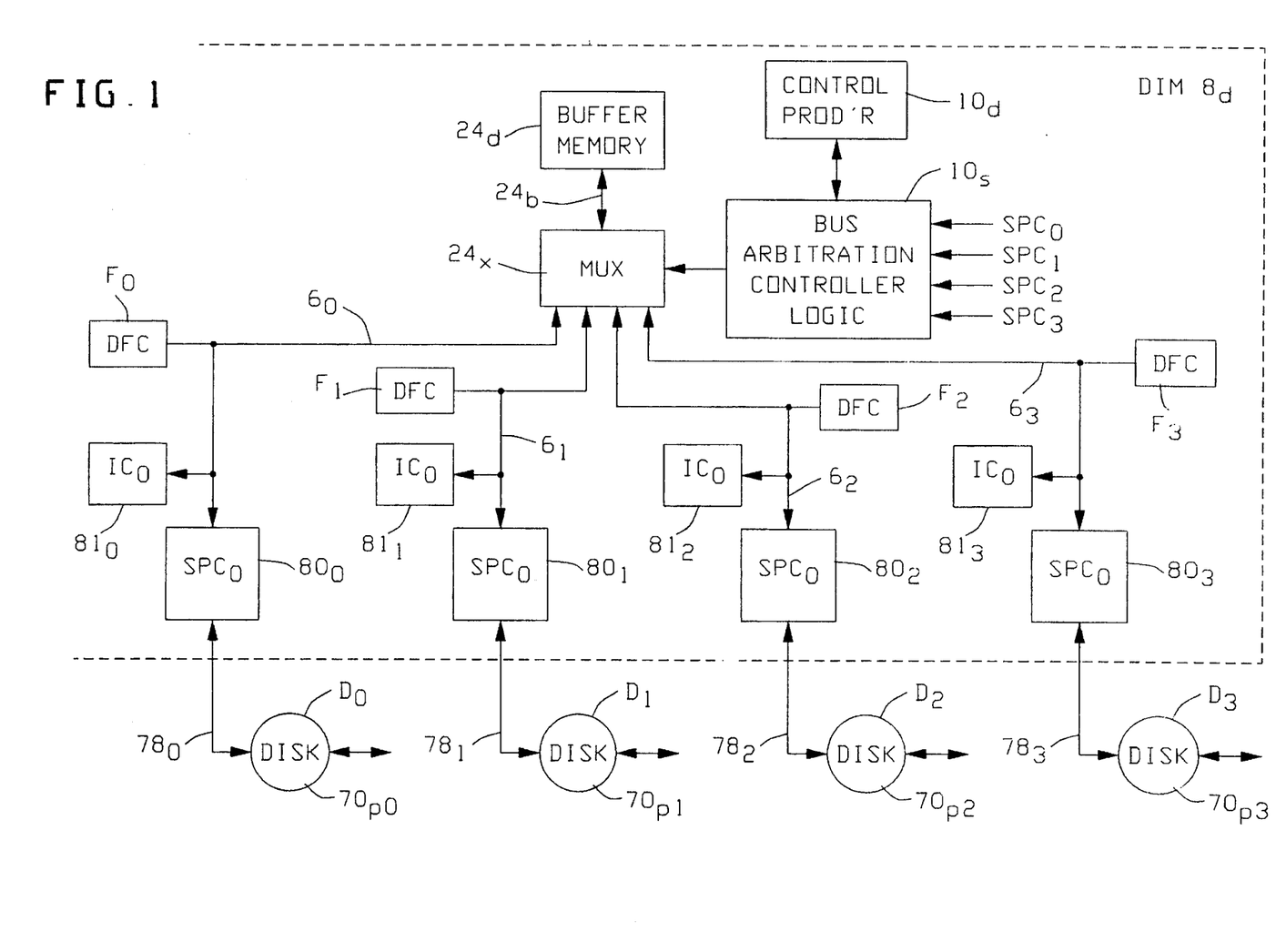
FIG. 1 is a block diagram showing the multi-channel integrity checking system whereby the buffer memory can provide storage of data going to and from a plurality of peripheral devices.

The presently described system of FIG. 1 provides a device interface module $8_d$ which permits four concurrently operating channels between the buffer memory $24_d$ and the peripheral units 70. Each channel is provided with its own integrity checking circuit Ic ($81_0$, $81_1$, $81_2$, $81_3$) which operates on-the-fly and insures that the data transfer on that channel is a correct data transfer.

SUMMARY OF THE INVENTION

A multi-channel integrity checking data transfer system is provided wherein a plurality of peripherals are connected to one or more device interface modules (DIM). The device interface module provides multiple bus channels for data transfer and each of the data transfer channels has its own personal integrity checking circuit, Ic.

Each of the integrity checking circuits functions to check the parity of each word transferred and subsequently checks the Error Detection Code signature by generating its own internal error detection code (EDC) for comparison with the original detection code in the data block, thus, to verify the integrity of the data transferred.

The device interface module has a buffer memory for holding data blocks received from a main host computer which data blocks are destined for transfer through a selected one of multiple channel buses to a selected peripheral device. Data blocks can also be transferred from a peripheral device through an associated protocol controller, a channel bus, and multiplexer over to the buffer memory for subsequent transmission to a main host computer.

A bus arbitration controller, sensitive to requests from each of a plurality of protocol controllers and also to the control processor of the device interface module (DIM), regulates the multiplexer by allocating equal time periods to each of the channel buses when all of the channel buses seek access to/from the buffer memory.

DESCRIPTION OF PREFERRED EMBODIMENT

Referring to FIG. 1, there is seen a diagram of the device interface module $8_d$ which provides four channel busses for data transfer to multiple numbers of peripheral devices 70 ($70_{p0}$, $70_{p1}$, $70_{p2}$, $70_{p3}$).

A buffer memory $24_d$ is a temporary storage unit for data which is being transferred between a plurality of host processors 4 and a plurality of peripheral units such as the disk drives 70.

The buffer memory $24_d$ has an internal bus connection to a multiplexor $24_x$ which provides connection to four channel busses enabling data transfer to a series of protocol controllers designated SPC 80 ($80_0$, $80_1$, $80_2$, $80_3$). The multiplexor $24_x$ connects the four channel buses designated $6_0$, $6_1$, $6_2$, and $6_3$ for connection from buffer memory $24_d$ to protocol controllers SPC 80. Each of the channel busses 6 is provided with its own individual integrity checking circuit ($81_0$, $81_1$, $81_2$, $81_3$). Thus, any data transfers on multiple channel busses 6 are individually checked for integrity by the integrity checking circuit 81 ($I_c$).

Referring to FIG. 1, there is seen a control processor $10_d$ which is a functioning module in each device interface module (DIM) and which is used to control the data transfer operations. The control processor $10_d$ will monitor the buffer $24_d$ in order to recognize when data is destined for any one of the peripheral devices or when data is destined for one of the host processors 4. Likewise, the control processor $10_d$ will monitor and initiate the integrity checking circuity 81 ($81_0$, $81_1$, $81_2$, $81_3$) and receive information as to whether or not the data transferred is valid. If the data transfer is found not be valid, then an interrupt signal will be transmitted to the control processor $10_d$.

The control processor $10_d$ (FIG. 1) also functions to: (i) get the number of data blocks (from CIM $8_c$ FIG. 2A) to be transferred on a given major I/O cycle; (ii) places the data blocks received in portions of buffer memory $24_d$ which are dedicated to each channel bus 6; (iii) determine whether the host command is a Read or a Write operation; (iv) inform each SPC 80 of the total number of blocks to be transferred on each major I/O cycle and also whether the major cycle is a Read or Write operation; (v) sets a counter in a data feed control circuit telling the SPC 80 how many data blocks are presently residing in buffer memory $24_d$ (which may be less than the transfer for the major I/O cycle) which can be transferred at the moment.

Figure 4:
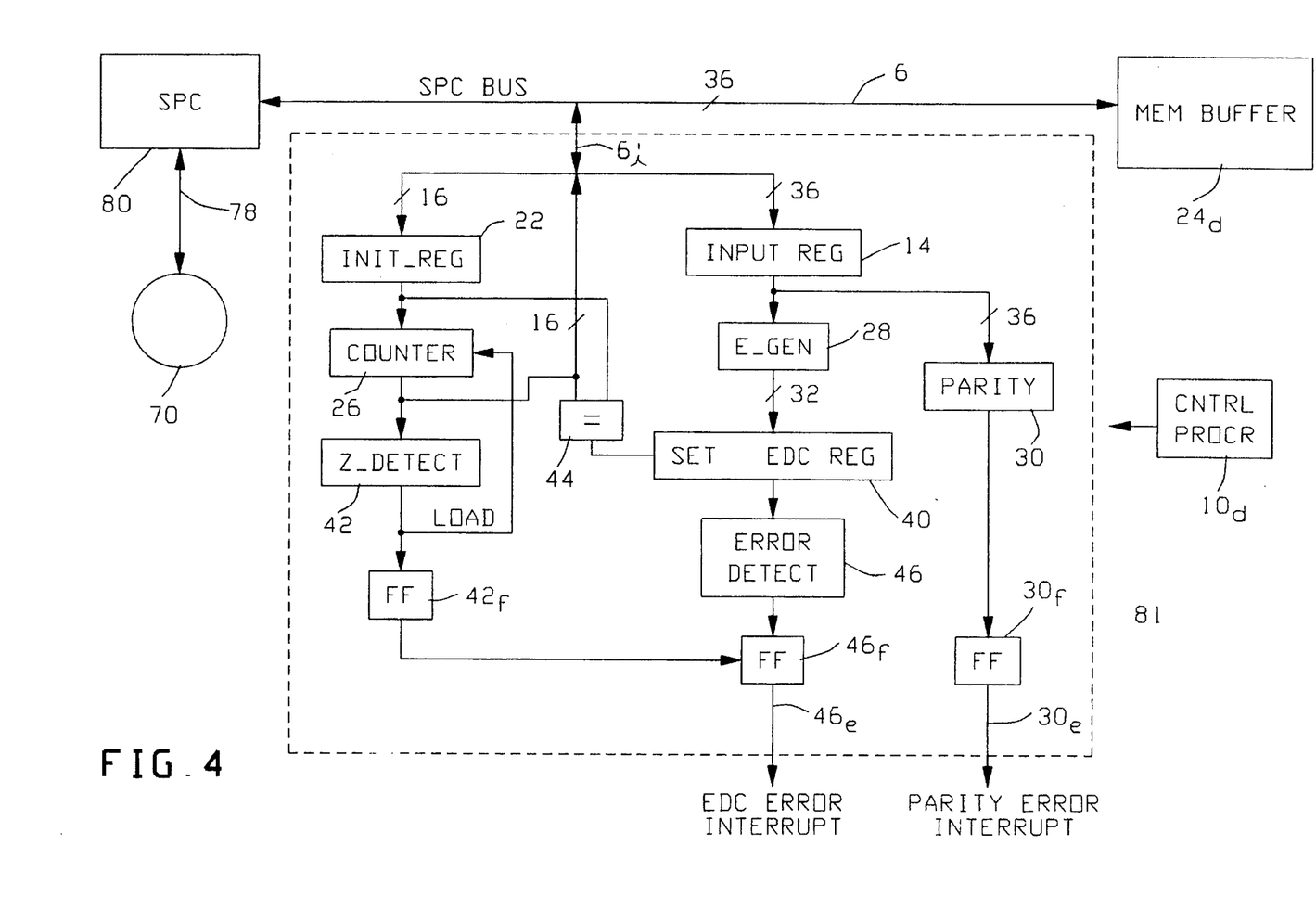
FIG. 4 is a diagram showing the integrity checking circuit connected to each of the channel busses.

An expanded view of a portion of the Device Interface Module (DIM) in FIG. 2B is shown in FIG. 4 wherein a memory buffer $24_d$ is connected by means of a bus 6 over to a SCSI Protocol Controller, (SPC) 80. The protocol controller 80 connects the bus 78 (FIG. 2B) to peripheral units, such as disk units 70. Attached to the protocol controller channel bus 6 is seen an auxiliary connecting bus $6_i$ which connects to two registers 22 and 14. The initialize register 22 and the input register 14 both function simultaneously to initialize the integrity checking circuit 81 and to store a duplicate of each data word (36 bits) being transferred on the protocol controller channel bus 6. Each word is placed momentarily in input register 14.

The initialize register 22 will also indicate the "size" of the block of data being transferred. The input register 14 makes a copy of each data word in the entire block. The input register 14 looks at each block and creates via generator 28 an internally generated error code signature. The purpose of this is to compare the original error detection code (EDC) signature provided at the end of each block (FIG. 4) with the locally internally generated EDC signature by generator 28.

The block counter 26 is used to count the number of data words (and bytes) transferred between the two digital modules $24_d$ and 80. The SCSI Protocol Controller (SPC) 80 loads the "size" of the data block into the initialize register 22 before the data transfer. When the block counter 26 reaches a preset limit, the data in the initialize register 22 is loaded into the block counter 26 to indicate the block size of the next coming block.

The Protocol Controller 80 can read the initialization register 22 in order to save its content when it switches to data transfers of a different block size. Additionally, the SPC 80 can restore the old value of the block counter by writing into these registers.

The initialization register 22 is programmable by the SPC 80 dynamically. The SPC 80 has a processor which loads the data block size into the initialization register 22 before the data transfer when the block counter 26 reaches its preset limit, then the initialization register 22 information on block size is loaded into the block counter 16 for the next block transfer. This is done when the zero detector circuit 42 senses when the counter 26 has reached zero and thus permits a reloading of the counter.

A block size comparator 44 is used to check the block size on the bus 6 with the block size counted by the counter 26. The output of the block size comparator 44 is used to feed the error detection code (EDC) register 40 for comparison to see if the original EDC value does or does not match the internally generated EDC code from generator 28.

The output of the zero detector 42 is fed to a pipeline flip-flop $42_f$ which is used to set the flip-flop $46_f$ which is the error detection code (EDC) error flip-flop. The flip-flop $42_f$ can only set up the flip-flop $46_f$ after the zero detector 42 has reached its zero value.

The data input register 14 is fed to the EDC generator 28 and also to parity checking circuit 30. The parity checking 30 checks for proper parity of each data word being transferred and if a parity error is detected will initiate flip-flop $30_f$ to generate a parity error interrupt signal 30 (FIG. 4) as the particular word is undergoing transfer. The EDC generator 28 generates an internal EDC signature for the data being transferred which is then compared to the original EDC signature sent along with the originally transmitted data block. The output of generator 28 is placed in the EDC register 40. From this, the error detection circuit $46_f$ can detect whether there has been an error detected or not. If so, then the flip-flop 46 is initiated in order to provide a EDC error interrupt signal on line $46_e$, which is conveyed to the control processor $10_d$.

In the presently described embodiment, the initialize register 22 and the block counter 26 are 16 bytes wide. Thus, the maximum size allowed is 65,536 words of 36 bits each. When an error is detected by the error detection unit 46 or parity error checker 30, then respectively the JK flip-flop $46_f$ and the JK flip-flop $30_f$ are set by the hardware and latched into the interrupt register for the control processor $10_d$. The two flip-flops $46_f$ and $30_f$ can be reset by the control processor by addressing the flip-flop and performing a write operation on it. The interrupt bit of the interrupt register in the control processor will be reset on the next clock.

It may be noted that the EDC error checking system and the parity error checking system can be "disabled" by the SPC 80 during initialization or when data blocks "without EDC signatures" are being transferred. In normal operation with EDC signatures, the system will allow the reporting of interrupts when the EDC error or parity error occurs.

The sequence of operation when data blocks are being transferred from the memory buffer $24_d$ over to the SCSI Protocol Controller 80 will operate as follows. The initialize register 22 will receive data to sense the size of the block, for example "X" bytes or a block of "Y" bytes). The input register 14 simultaneously copies word by word, the data of the entire block, and the final EDC original signature is placed in the EDC register 40 and is compared with internally generated signature from the signature generator 28. If these match, then there has been no EDC error. On the other hand, if these do not match, then the error detection circuit 46 will activate the EDC error interrupt flip-flop $46_f$ in order to send a interrupt signal on line $46_e$. Thus, the signature generated in the EDC generator 28 is put in the EDC register 40 for comparison with the original EDC signature. The error detection 46 compares the two signatures and determines whether an EDC error has occurred. When a new block of data of a different size is subsequently being transferred, then the initialize register 22 will read the first word in order to tell the block size of the data block being transferred.

Figure 7:
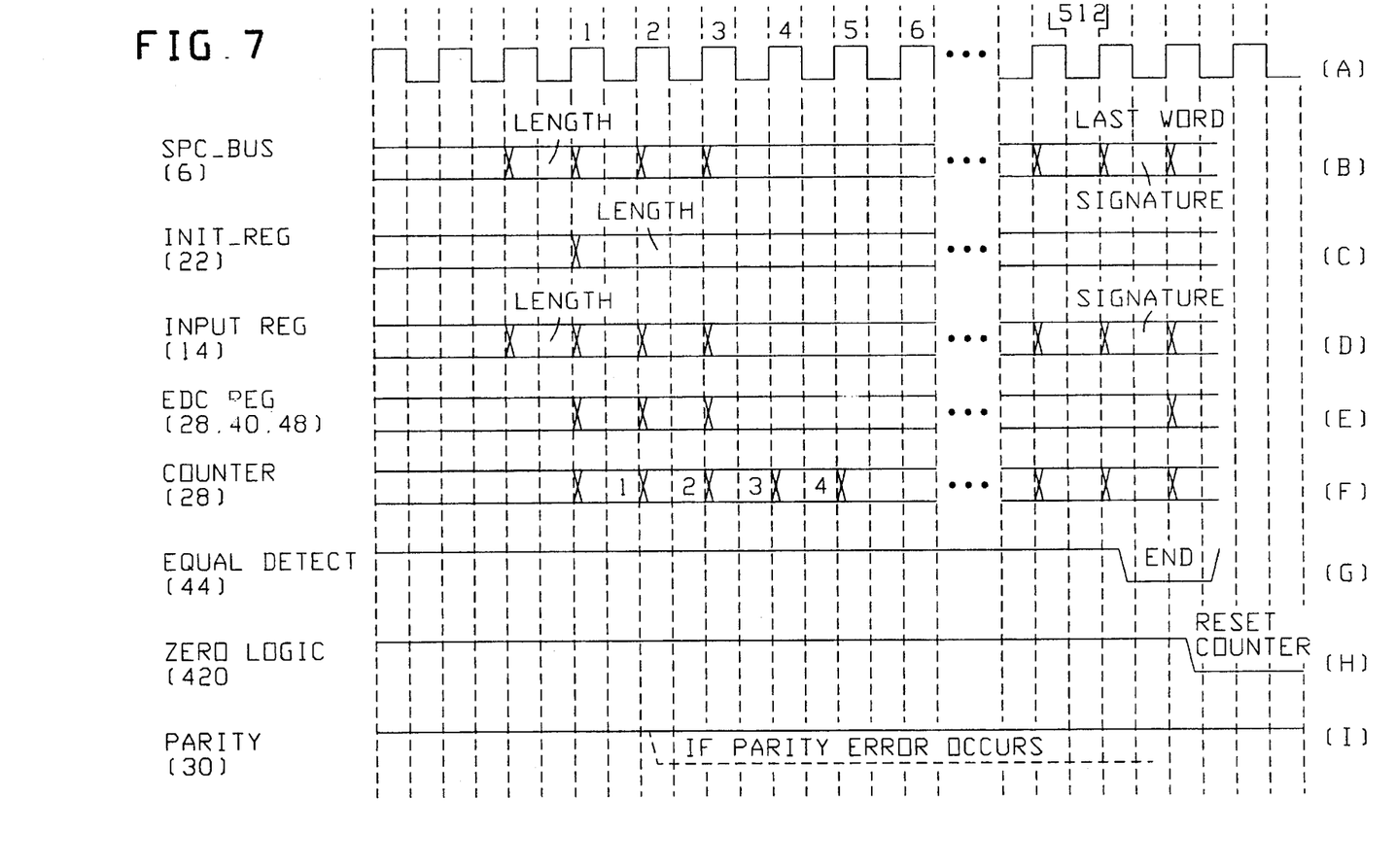
FIG. 7 is a timing diagram showing the integrity checking operations which occur on-the-fly while data is being transferred on the channel bus.

Referring to FIG. 7, there is illustrated a timing diagram of the sequence of functions involved.

Line A is illustrative of the timing clock signals. Line B shows data on the SPC bus 6 (clock I where the first word indicates the block size as being, for example, 512 bytes. Then on each succeeding clock 2, 3, 4, etc. another word (36 bits) is transferred until, at clock 512, the original EDC signature is transferred. FIG. 6 shows a typical example of an EDC signature. Line C indicates how the initialization register 22 will copy each data word being transferred on SPC bus 6. Line D indicates how input register 14 also copies each data word from the SPC bus 6, in order to generate an internal EDC signature. Line E shows how the EDC generator 28 works to generate a new code value for each word on each clock until, at clock 512, the complete internally generated EDC is completed and to be placed in EDC register 40. At clock 512, this internally generated EDC will be compared to the original EDC signature in register 44 (FIG. 4). If there is a mismatch, then error detector 46 will flag the processor via flip-flop $46_f$. Line F indicates how the counter 26 (FIG. 4) counts down each byte from its original setting of 512 bytes. The counter 26 was originally set to 512 (bytes) by the initialization register 22 which received information on the length of the block (block size). The zero detector circuit 21 (FIG. 4) indicates when the 512 bytes of data have been transferred between digital modules, i.e. the end of the data block. Line G illustrates how the EDC comparison register operates to signal a "match" or "mismatch" after clock 512. Line H indicates how the zero detector circuit 44 will reset counter 26 after clock 512. Line I indicates how the parity check circuit 30 checks the parity of each word transferred on each clock 1, 2, 3, . . . 512.

Referring to FIG. 1, each channel bus 6 operates through multiplexer $24_x$ to buffer memory $24_d$. The multiplexer $24_x$ is controlled by the arbitration logic $10_a$ which allocates equal periods of time access to each of the channel buses $6_a$. Thus no channel bus is starved or neglected. The arbitration logic $10_a$ receives access request signals from the protocol controllers, SPC 80. For versatility the control processor $10_d$ can be programmed to run the arbitration logic $10_a$ so that only one requesting SPC will get access to its channel bus in situations where there is no activity needed on the other channel buses.

It should be indicated that concurrent I/O operations are on-going on all of the channel buses since while the $SPC_0$ may have a major I/O cycle to transfer 100 blocks and $SPC_1$, may have a major I/O cycle of 200 blocks (with other block numbers in $SPC_2$, $SPC_3$), the buffer memory $24_d$ at a given time may only be storing 10 blocks for $SPC_0$ and only have 20 blocks for $SPC_1$, etc.

In this situation, as seen in FIG. 1, each channel bus 6 has a Data Feeder Control circuit (DFC) designated as $F_0$, $F_1$, $F_2$, $F_3$ which senses the data block availability in each segment of buffer memory $24_d$ and provides a minor I/O cycle to permit transfer of the data block available in buffer memory $24_d$ even though more data blocks will be forth coming to complete the major I/O transfer cycle.

With the situation where major I/O cycles are continuously being accomplished by using minor I/O cycles on a time sliced basis, it can be seen that each channel bus 6 must have its own dedicated integrity checking circuit, Ic, 81. If the architecture tried to use only one integrity circuit on bus $24_b$ (FIG. 1) then it would not be possible to use the time slices of multiple minor I/O cycles to accomplish the major I/O cycles with integrity.

Since the buffer memory $24_d$ operates at an input/output speed of 80 megabytes per second while the transfers between the peripheral and SPC 80 only run at 10 megabytes per second, it can be seen that there is no penalty for allocating time slices among the several channel buses, since so much more data is passed to the SPC that it must buffer data in internal FIFO registers.

Disclosed herein has been a data transfer system providing integrity of data performed on-the-fly by an associated integrity circuit which senses parity for each word transferred and also checks the error detection code (EDC) signature for each block transferred. The integrity circuitry can also be disabled when data transfers involve blocks which do not provide an EDC signature. The on-the-fly integrity checking occurs concurrently on each channel bus that is actively transferring data. Each of the multiple SCSI Protocol Controllers (SPC) can be concurrently operating in data transfer operations between the several peripheral devices and the several protocol controllers (SPCs). Data blocks can be transferred through a series of concurrent minor I/O cycles on each of the channel buses to fulfill a commanded major I/O cycle of block transfers with assurance of integrity.

While the preferred embodiment has been described, there may be other configurations which handle the problems of data transfer integrity using the concepts of the attached claims, but which are still taught by the attached claims.

What is claimed is:

1. A data transfer system for conveying different length blocks of data bytes between a plurality of host computers and a plurality of peripheral devices said data blocks having different byte lengths and a Block Error Detection Code for each block, said system comprising:
   (a) a plurality of channel interface means connecting said plurality of host computers to first and second system busses of a dual system bus means;
   (b) a plurality of device interface modules connecting said dual system bus means to said plurality of peripheral devices wherein each one of said device interface modules includes:
      (b1) buffer memory means for holding data being transferred between said host computers and said peripheral devices said memory means having dedicated segments for holding data blocks targeted for specific peripheral devices and specific host computers.
      (b2) a plurality of channel busses wherein each bus provides a data path between said buffer memory means and a protocol-controller dedicated to each peripheral unit and wherein each said data path includes:
         (b2a) an integrity checking circuit means operating on-the-fly which includes:
            (i) means to check the parity of each word transferred on said channel bus;
            (ii) means to generate an Error Detection Code (EDC) for each block for comparison with said Block Error Detection Code;
            (iii) means to signal a parity error and Error Detection Code error to a control processor means;
         (b2b) a data feeder control unit for sensing the number of data blocks presently available for transfer in said buffer memory means dedicated segment;
         (b2c) a plurality of protocol-controller means each of which provides communication paths to a specific peripheral device;
         (b2d) multiplexer means for connecting each said data path to said buffer memory means and including:
            (i) bus arbitration means for allocating access to said buffer memory means for each of said protocol-controller means;
         (b2e) control processor means for executing Read and Write commands from said host processor and for selecting a specific dedicated segment in said buffer memory means including:
            (i) setting a number value in each said data feeder control unit to indicate the number of data blocks transferred;
            (ii) completing the transfer of the specified number of data blocks for each Read/Write command.

2. In a computer network wherein a host processor generates Write/Read commands to initiate a major cycle for the transfer of "N" blocks of data between a host processor and a specific peripheral device, a multiple path integrity checking data transfer system comprising:
   (a) a buffer memory means having specialized segments for data being transferred between a plurality of peripheral devices and a plurality of host computers;
   (b) a plurality of channel busses wherein each bus provides a data path between a dedicated protocol-controller means connected to a specific peripheral device and to a specialized segment in said buffer memory means;
   (c) integrity checking means for monitoring the data transfers on each said channel bus;
   (d) means to allocate bus access to said specialized segment in said buffer memory means for each of said dedicated protocol-controller means;
   (e) a plurality of said protocol-controller means where each protocol-controller means is dedicated to a specific group of peripheral devices;
   (f) a plurality of data feed control means for each of said channel busses wherein each data feed control means includes:
      (f1) means to sense the presently available data blocks in said specialized segment which can be transferred;
      (f2) means to signal a control processor when less than said N blocks of data have been transferred;
   (g) control processor means for executing said Read/Write commands including:
      (g1) means to complete the transfer of N blocks after only a partial transfer of said N blocks had been completed.

3. The system of claim 1 which includes:
   (a) bus arbitration means responsive to requests from each of said protocol controller means and including:
      (a1) means to activate a multiplexer means for granting access to a selected one of said channel busses for a preset period of time.

4. The system of claim 2 wherein each of said integrity checking means includes:
   (a) means to check the parity of each byte of each word transferred on each channel bus.

5. The system of claim 4 wherein each of said integrity checking means includes:
   (a) means to check the integrity of data blocks having different lengths of data words, said means including;
      (a1) means to Generate an internal error detection code (EDC) for each data block transferred;

(a2) means to compare said internal EDC with an original EDC in each block of data transferred to validate the accuracy of the data block transferred.

6. The system of claim 2 wherein said means to allocate bus access includes:
 (a) channel bus arbitration logic means responsive to bus access requests from each of said protocol-controller means;
 (b) control processor means to sense which specialized segment of said buffer memory means is holding data words destined for a specific peripheral device, said means including:
  (b1) means to inform said protocol-controller means that data blocks for transfer are available in said buffer memory means.

7. The system of claim 6 wherein said means to allocate bus access includes:
 (a) means to provide equal bus access time periods to each of said protocol-controller means when said buffer memory means is holding data words for each of said specific peripheral devices.

* * * * *